(12) United States Patent
Song et al.

(10) Patent No.: US 10,103,670 B2
(45) Date of Patent: Oct. 16, 2018

(54) MOTOR CONTROL SYSTEM AND METHOD AND DEVICE FOR CONTROLLING POWER FACTOR ON MOTOR SIDE

(71) Applicant: Guangdong Meizhi Compressor Co., Ltd., Foshan (CN)

(72) Inventors: Wanjie Song, Foshan (CN); Xinjie Ren, Foshan (CN); Siqing Liao, Foshan (CN); Weimin Xiang, Foshan (CN); Yongjun Fu, Foshan (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 0 days.

(21) Appl. No.: 15/302,599

(22) PCT Filed: Sep. 11, 2015

(86) PCT No.: PCT/CN2015/089453
§ 371 (c)(1),
(2) Date: Oct. 7, 2016

(87) PCT Pub. No.: WO2017/041300
PCT Pub. Date: Mar. 16, 2017

(65) Prior Publication Data
US 2018/0175767 A1 Jun. 21, 2018

(51) Int. Cl.
*G05F 1/70* (2006.01)
*H02P 23/26* (2016.01)
(Continued)

(52) U.S. Cl.
CPC .............. *H02P 23/26* (2016.02); *H02K 1/28* (2013.01); *H02K 21/029* (2013.01); *H02P 6/28* (2016.02);
(Continued)

(58) Field of Classification Search
USPC .......................... 318/729, 438, 538
See application file for complete search history.

(56) References Cited

U.S. PATENT DOCUMENTS 5,373,223 A * 12/1994 Akagi ................. H02M 5/4585
318/438
2003/0071596 A1 4/2003 Gokhale et al.
(Continued)

FOREIGN PATENT DOCUMENTS

CN 103560735 A 2/2014
CN 103607155 A 2/2014
(Continued)

OTHER PUBLICATIONS

Japanese Patent Application No. 2017513451 Office Action dated Feb. 13, 2018, 3 pages.
(Continued)

*Primary Examiner* — Bentsu Ro
*Assistant Examiner* — Iftekhar Mustafa
(74) *Attorney, Agent, or Firm* — Lathrop Gage LLP

(57) ABSTRACT

The present disclosure provides a method and a device for controlling a power factor on motor side and a system having the same, and the method includes: controlling the motor using a control approach of Id'=0 so as to obtain quadrature-axis voltage Uq' and direct-axis voltage Ud' in a virtual coordinate system of a current control cycle; calculating a first control value according to Uq' and Ud'; obtaining a power factor control target value, and calculating a target control value according to the power factor control target value; performing a PI control on a difference between the target control value and the first control value so as to obtain a coordinate deviation angle, and overlapping the coordinate deviation angle to a motor angle of the current control cycle so as to build a virtual coordinate system of a (Continued)

next control cycle, such that the power factor on the motor side is controllable.

12 Claims, 3 Drawing Sheets

(51) Int. Cl.
    *H02P 21/00*     (2016.01)
    *H02P 21/22*     (2016.01)
    *H02P 6/28*     (2016.01)
    *H02K 1/28*     (2006.01)
    *H02K 21/02*     (2006.01)
    *H02P 27/08*     (2006.01)

(52) U.S. Cl.
    CPC ............. *H02P 21/00* (2013.01); *H02P 21/22* (2016.02); *H02P 27/08* (2013.01); *H02P 21/0089* (2013.01)

(56) References Cited

U.S. PATENT DOCUMENTS

| | | |
|---|---|---|
| 2005/0218862 A1 | 10/2005 | Huggett et al. |
| 2007/0040524 A1 | 2/2007 | Sarlioglu et al. |
| 2013/0013154 A1* | 1/2013 | Aoki ..................... B62D 5/046 701/42 |
| 2013/0069568 A1 | 3/2013 | Krefta et al. |
| 2014/0125261 A1* | 5/2014 | Yamazaki ........... H02P 21/0039 318/400.02 |
| 2014/0210387 A1 | 7/2014 | Zhao et al. |
| 2015/0333681 A1* | 11/2015 | Matsuki .................. H02P 21/06 318/400.02 |

FOREIGN PATENT DOCUMENTS

| | | |
|---|---|---|
| CN | 105119480 A | 2/2015 |
| JP | 2002238278 A | 8/2002 |
| JP | 2008199868 A | 8/2008 |
| JP | 2010148270 A | 7/2010 |

OTHER PUBLICATIONS

European Patent Application No. 15885771.4 extended Search and Opinion dated Dec. 19, 2017, 9 pages.
Japanese Patent Application No. 2017513451 English translation of Office Action dated Feb. 13, 2018, 3 pages.
PCT/CN2015/089453, English Translation of International Search Report dated May 26, 2016, 3 pages.

* cited by examiner

MOTOR CONTROL SYSTEM AND METHOD AND DEVICE FOR CONTROLLING POWER FACTOR ON MOTOR SIDE

CROSS REFERENCE TO RELATED APPLICATION

This application is a U.S. National Phase application of the International Patent Application No. PCT/CN2015/089453, filed on Sep. 11, 2015, the entire contents of which are incorporated by reference as part of the disclosure of this U.S. application.

FIELD

The present disclosure relates to motor control technology field, and more particularly to a method and a device for controlling a power factor on motor side and a motor control system.

BACKGROUND

With a rapid development of the frequency conversion control technology and a promotion of a concept of raising efficiency and saving energy, a large progress has been achieved on controlling a permanent magnet synchronous motor. However, some deficiencies still occur in controlling a power factor of the permanent magnet synchronous motor.

For example, when a control method of Id=0 or Maximum Torque Per Ampere (MTPA) is used to control the motor, the power factor is not controlled, and if the load of the motor is heavy or the flux weakening is deep, then the power factor is getting worse, such that an actual requirement can not be satisfied. In addition, when a motor angle is estimated without a location sensor, since the location estimation is completed based on a situation in which operation parameters of the motor are relatively accurate, the control of Id=0 will become a flux increasing control or a flux weakening control if the operation parameters of the motor are not accurate, such that an actual control effect may not be achieved.

SUMMARY

The present disclosure seeks to solve at least one of the problems existing in the related art to at least some extent. Therefore, an objective of the present disclosure is to provide a method for controlling a power factor on motor side, which can control the power factor on the motor side accurately.

Another objective of the present disclosure is to provide a device for controlling a power factor on motor side. Yet another objective of the present disclosure is to provide a motor control system.

In order to achieve the above objectives, according to an aspect of embodiments of the present disclosure, a method for controlling a power factor on motor side is provided, and the method includes following steps: controlling the motor using a control approach of Id'=0 so as to obtain a quadrature-axis voltage Uq' and a direct-axis voltage Ud' in a virtual coordinate system of a current control cycle; calculating a first control value according to the quadrature-axis voltage Uq' and the direct-axis voltage Ud' in the virtual coordinate system of the current control cycle; obtaining a power factor control target value, and calculating a target control value according to the power factor control target value; and performing a PI control on a difference between the target control value and the first control value so as to obtain a coordinate deviation angle, and overlapping the coordinate deviation angle to a motor angle of the current control cycle so as to build a virtual coordinate system of a next control cycle, such that the power factor on the motor side is controllable.

In order to achieve the above objectives, according to another aspect of embodiments of the present disclosure, a device for controlling a power factor on motor side is provided, and the device includes a deviation angle calculating circuit and a control circuit. The control circuit controls the motor using a control approach of Id'=0 so as to obtain a quadrature-axis voltage Uq' and a direct-axis voltage Ud' in a virtual coordinate system of a current control cycle. The deviation angle calculating circuit calculates a first control value according to the quadrature-axis voltage Uq' and the direct-axis voltage Ud' in the virtual coordinate system of the current control cycle, obtains a power factor control target value, calculates a target control value according to the power factor control target value, and performs a PI control on a difference between the target control value and the first control value so as to obtain a coordinate deviation angle. The control circuit overlaps the coordinate deviation angle to a motor angle of the current control cycle so as to build a virtual coordinate system of a next control cycle, such that the power factor on the motor side is controllable.

In addition, a motor control system is provided in embodiments of the present disclosure, and the motor control system includes the above-described device for controlling a power factor on motor side.

Figure 1:
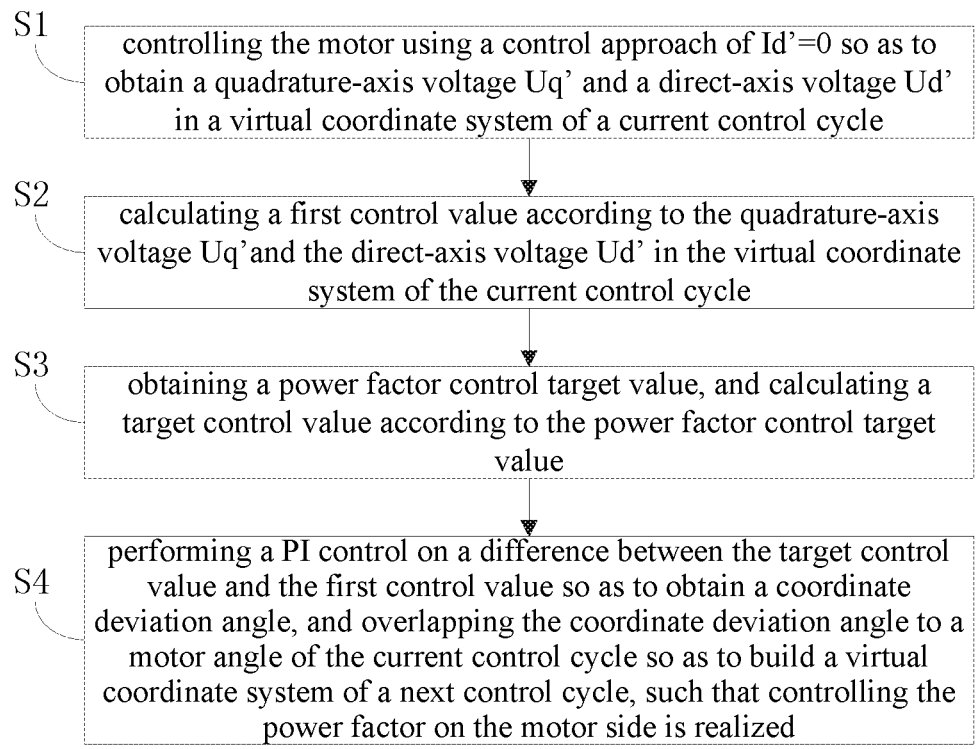
FIG. 1 is a flow chart of a method for controlling a power factor on motor side according to embodiments of the present disclosure.

ELEMENT LIST deviation angle calculating circuit 10, control circuit 20 and location estimating circuit 30

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A method and a device for controlling a power factor on motor side and a motor control system are described below with reference to accompanying drawings.

FIG. 1 is a flow chart of a method for controlling a power factor on motor side according to embodiments of the present disclosure. As shown in FIG. 1, the method includes following steps.

In step S1, the motor is controlled using a control approach of Id'=0 so as to obtain a quadrature-axis voltage Uq' and a direct-axis voltage Ud' in a virtual coordinate system of a current control cycle. The motor may be a Permanent Magnet Synchronous Motor (PMSM).

In step S2, a first control value is calculated according to the quadrature-axis voltage Uq' and the direct-axis voltage Ud' in the virtual coordinate system of the current control cycle.

Figure 2:
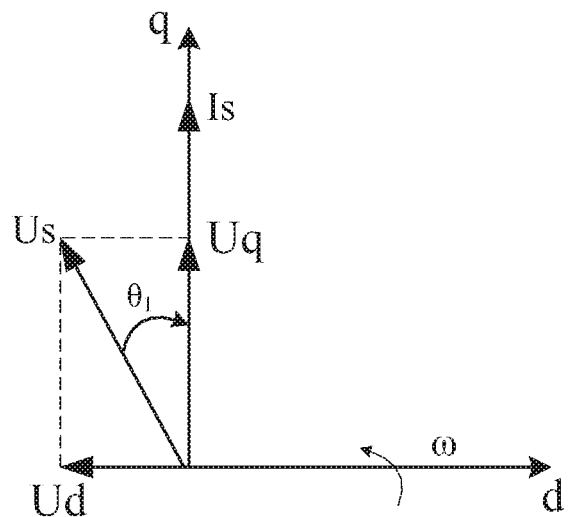
FIG. 2 is a vector diagram of voltage and current of the motor in a control approach of Id=0 in the related art.

Specifically, the power factor on motor side refers to a cosine value of an angle between a voltage vector and a current vector of the motor. As shown in FIG. 2, when the motor is controlled by using a control method in which the d-axis current is zero (i.e., Id=0), the power factor on motor side is $\cos\theta_1 = Uq/Us$, where, $\theta_1$ is the angle between the voltage vector and the current vector of the motor, Uq is a q-axis voltage, and Us is a voltage magnitude of the motor. At this time, the power factor on motor side $\cos\theta_1$ is uncontrollable. If there is a need to control the power factor on motor side to be any value, it is required to control the d-axis current as Id≠0, e.g. control the d-axis current as Id>0 or Id<0. However, if the calculation approach of the power factor on motor side still adopts the above described Id=0, an arbitrary control of the power factor on motor side may not be realized. Therefore, in embodiments of the present disclosure, the arbitrary control of the power factor on motor side may be realized based on a given virtual coordinate system d' q'.

Figure 3:
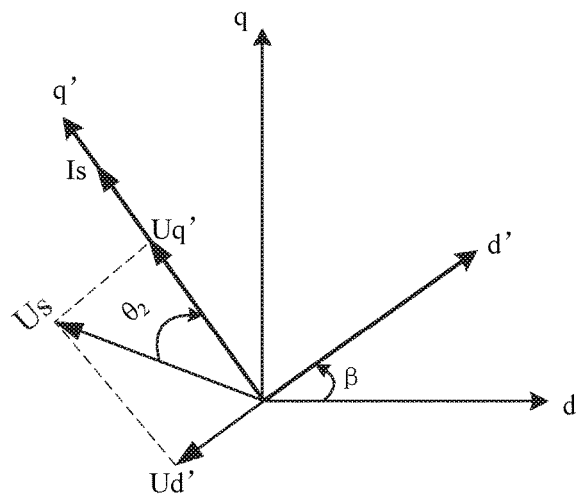
FIG. 3 is a vector diagram of voltage and current of the motor in a control approach of Id'=0 according to an embodiment of the present disclosure.

Specifically, as shown in FIG. 3, assuming that Id<0, and an angle between the current vector and q-axis is β, then a new coordinate system (i.e., the d'q' virtual coordinate system) may be built on the basis of the current vector, in which the angle difference between a direct-axis (d'-axis) and the d-axis is β. During the motor control process, in the d'q' virtual coordinate system, a control approach of Id'=0 is used to control the motor, and then the power factor on motor side is $\cos\theta_2 = Uq'/Us$, where, $\theta_2$ is an angle between the voltage vector and the current vector of the motor in the virtual coordinate system, and Uq' is a quadrature-axis (q'-axis) voltage in the virtual coordinate system. In other words, when there is a need to control the power factor on motor side to be an arbitrary value, a control approach of Id'=0 is used to control the motor in the d'q' virtual coordinate system, and during the motor control process, the power factor on motor side of the current control cycle is calculated by obtaining the quadrature-axis voltage Uq' and the direct-axis voltage Ud' in the virtual coordinate system of the current control cycle, and a first control value is calculated. According to an embodiment of the present disclosure, the first control value is calculated according to following formula (1):

$$A = (Uq')^2 / (Uq')^2 + (Ud')^2 \qquad (1)$$

where, A is the first control value, Uq' is the quadrature-axis voltage in the virtual coordinate system, and Ud' is the direct-axis voltage in the virtual coordinate system.

It can be understood that, an absolute value of a square root of the first control value A is the power factor on motor side of the current control cycle under the control approach of Id'=0.

In step S3, a power factor control target value is obtained, and a target control value is calculated according to the power factor control target value.

In step S4, a PI control is performed on a difference between the target control value and the first control value so as to obtain a coordinate deviation angle, and the coordinate deviation angle is overlapped to a motor angle of the current control cycle so as to build a virtual coordinate system of a next control cycle, such that the power factor on the motor side is controllable.

Assuming that the power factor target control value is $\cos(\theta)\_set$, then the target control value is $(\cos(\theta)\_set)^2$. When the power factor on the motor side needs to be controlled as $\cos(\theta)\_set$, the coordinate deviation value β is obtained by performing a PI control on a difference $(\cos(\theta)\_set)^2 - (Uq')^2/(Uq')^2 + (Ud')^2$ between the target control value and the first control value, e.g. calculating the coordinate deviation angle β by performing the PI control on $(\cos(\theta)\_set)^2 - (Uq')^2/(Uq')^2 + (Ud')^2 = 0$, and the coordinate deviation angle β is overlapped on the motor angle of the current control cycle so as to build a d'q' virtual coordinate system of the next control cycle, such that controlling the power factor on motor side is realized by a constant cycle control.

In other words, in embodiments of the present disclosure, the virtual coordinate system d'q' is built by rotating the coordinate system dq, and the motor is controlled using the control approach of Id'=0 in the virtual coordinate system d'q', such that the angle between the voltage vector and the current vector of the motor is the angle between Uq' and Us, thus realizing the control of the power factor on motor side.

According to an embodiment of the present disclosure, the motor angle is obtained by performing location estimation on the motor. For example, the motor angle of the current control cycle may be obtained by performing the location estimation on the motor without a location sensor, in which the motor angle is in terms of the coordinate system dq.

According to an embodiment of the present disclosure, before overlapping the coordinate deviation angle to the motor angle of the current control cycle, an angle limiting process is performed to the coordinate deviation angle, thus avoiding an out-of-step of the motor control caused by an abnormal control of the power factor on motor side.

Figure 4:
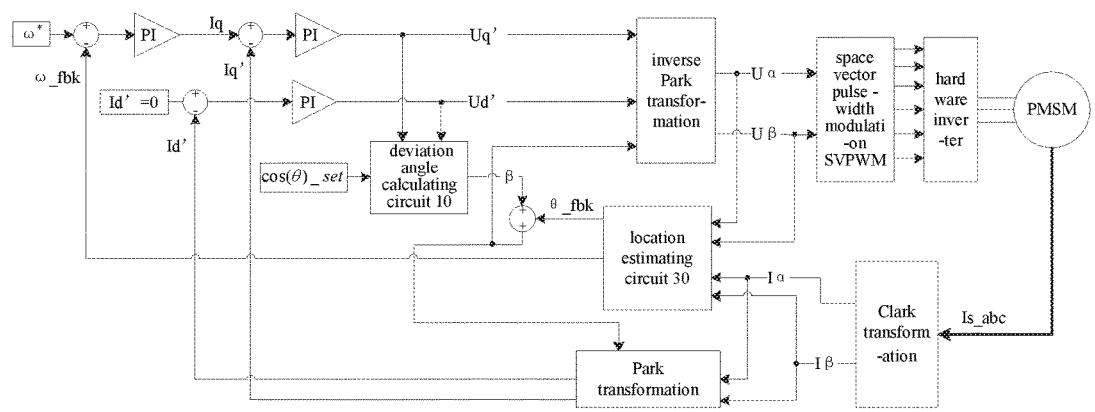
FIG. 4 is a schematic diagram of a motor control system according to an embodiment of the present disclosure.

Further, as shown in FIG. 4, during the process of controlling the motor using the control approach of Id'=0, the current of the motor in the current control cycle may be obtained via a current transformer, direct-axis current Id' and quadrature-axis current Iq' in the virtual coordinate system of the current control cycle are obtained by performing a Clark transformation and a Park transformation on the current of the motor, and the PI control is performed on the direct-axis current Id' and the quadrature-axis current Iq' in the virtual coordinate system of the current control cycle respectively, so as to obtain the direct-axis voltage Ud' and quadrature-axis voltage Uq' of the current control cycle.

Figure 5:
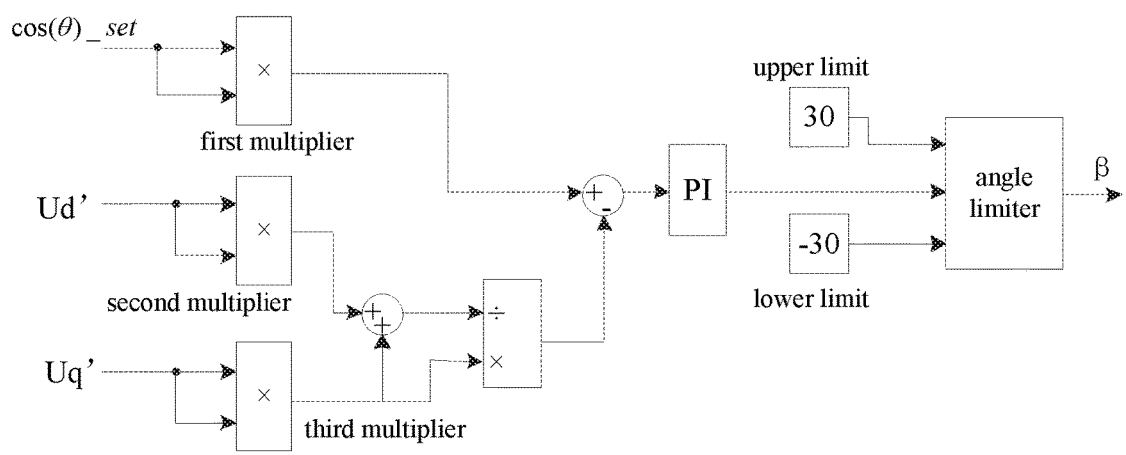
FIG. 5 is a schematic diagram of obtaining a coordinate deviation angle according to an embodiment of the present disclosure.

A deviation angle calculating circuit obtains a coordinate deviation angle according to a given power factor control target value and the obtained direct-axis voltage Ud' and quadrature-axis voltage Uq' of the current control cycle, the specific obtaining process of which is shown in FIG. 5. As shown in FIG. 5, a first coordinate deviation angle is outputted by performing the PI control on a difference $(\cos(\theta)\_set)^2 - (Uq')^2/(Uq')^2 + (Ud')^2$ between the target control value and the first control value, and then the coordinate deviation angle β is outputted by performing with an angle limiter a limit process on the first coordinate deviation angle outputted after the PI control, in which, an upper limit of the angle limiter may be 30 degree, and the lower limit may be −30 degree.

Meanwhile, the motor angle θ_fdk of the current control cycle is obtained by a location estimating circuit, and the coordinate deviation angle β is overlapped onto the motor angle θ_fdk of the current control cycle so as to participate in an inverse Park transformation and the Park transformation of the next control cycle, such that controlling the power factor on motor side is realized by a constant cycle control.

In conclusion, with the method for controlling a power factor on motor side according to embodiments of the present disclosure, the quadrature-axis voltage Uq' and the direct-axis voltage Ud' in the virtual coordinate system of the current control cycle are obtained by controlling the motor using a control approach of Id'=0, the coordinate deviation angle is obtained according to the quadrature-axis voltage Uq', the direct-axis voltage Ud' and the power factor control target value, and the coordinate deviation angle is overlapped to the motor angle of the current control cycle so as to build the virtual coordinate system of a next control cycle, such that the power factor on the motor side is controllable. In other words, the virtual coordinate system is built by rotating the coordinate system dq, and the motor is controlled using the control approach of Id'=0 in the virtual coordinate system, such that an angle between voltage vector and current vector of the motor is an angle between Uq' and a vector sum of Uq' and Ud' in the virtual coordinate system, thus realizing an accurate control for the power factor on motor side without obtaining the accurate operation parameters of the motor, increasing the usage efficiency of a frequency converter, a driving efficiency and a working efficiency of the motor.

Figure 6:
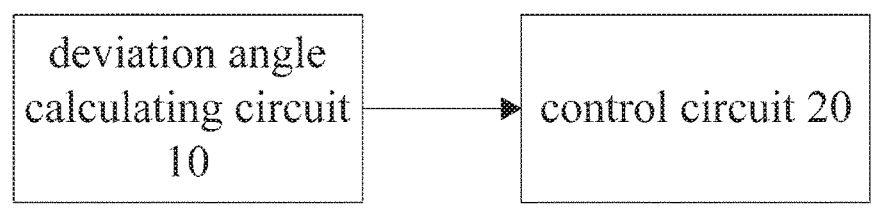
FIG. 6 is a block diagram of a device for controlling a power factor on motor side according to embodiments of the present disclosure.

FIG. 6 is a block diagram of a device for controlling a power factor on motor side according to embodiments of the present disclosure. As shown in FIG. 6, the device for controlling a power factor on motor side includes a deviation angle calculating circuit 10 and a control circuit 20.

The control circuit 20 controls the motor using a control approach of Id'=0 so as to obtain a quadrature-axis voltage Uq' and a direct-axis voltage Ud' in a virtual coordinate system of a current control cycle, and the deviation angle calculating circuit 10 calculates a first control value according to the quadrature-axis voltage Uq' and the direct-axis voltage Ud' in the virtual coordinate system of the current control cycle, obtains a power factor control target value, calculates a target control value according to the power factor control target value, and performs a PI control on a difference between the target control value and the first control value so as to obtain a coordinate deviation angle. The control circuit 20 overlaps the coordinate deviation angle to a motor angle of the current control cycle so as to build a virtual coordinate system of a next control cycle, such that controlling the power factor on the motor side is realized Specifically, the power factor on motor side refers to a cosine value of the angle between voltage vector and current vector of the motor. As shown in FIG. 2, when the motor is controlled by using a control method in which the d-axis current is zero (i.e., Id=0), the power factor on motor side is $\cos\theta_1 = Uq/Us$, where, $\theta_1$ is the angle between the voltage vector and the current vector of the motor, Uq is a q-axis voltage, and Us is a voltage magnitude of the motor. At this time, the power factor on motor side $\cos\theta_1$ is uncontrollable. If there is a need to control the power factor on motor side to be an arbitrary value, it is required to control the d-axis current as Id≠0, e.g. control the d-axis current as Id>0 or Id<0. However, if the calculation approach of the power factor on motor side still adopts the above described Id=0, an arbitrary control of the power factor on motor side may not be realized. Therefore, in embodiments of the present disclosure, the arbitrary control of the power factor on motor side may be realized based on a given virtual coordinate system d'q'.

Specifically, as shown in FIG. 3, assuming that Id<0, and an angle between the current vector and q-axis is β, then a new coordinate system (i.e. the d'q' virtual coordinate system) may be built on the basis of the current vector, in which the angle difference between a direct-axis (d'-axis) and the d-axis is β. During the motor control process, in the d'q' virtual coordinate system, a control approach of Id'=0 is used by the control circuit 20 to control the motor, and then the power factor on motor side is $\cos\theta_2 = Uq'/Us$, where, $\theta_2$ is an angle between the voltage vector and the current vector of the motor in the virtual coordinate system, and Uq' is a quadrature-axis (q'-axis) voltage in the virtual coordinate system. In other words, when the control circuit 20 controls the power factor on motor side to be an arbitrary value, a control approach of Id'=0 is used to control the motor in the d'q' virtual coordinate system, and during the motor control process, the power factor on motor side of the current control cycle is calculated by obtaining the quadrature-axis voltage Uq' and the direct-axis voltage Ud' in the virtual coordinate system of the current control cycle, and a first control value is calculated.

According to an embodiment of the present disclosure, the first control value is calculated according to the above formula (1). It can be understood that, an absolute value of a square root of the first control value A is the power factor on motor side of the current control cycle under the control approach of Id'=0.

Assuming that the power factor target control value is $\cos(\theta)\_set$, then the target control value is $(\cos(\theta)\_set)^2$. When the power factor on the motor side needs to be controlled as $\cos(\theta)\_set$, the coordinate deviation value β is obtained by performing a PI control on a difference $(\cos(\theta)\_set)^2 - (Uq')^2/((Uq')^2 + (Ud')^2)$ between the target control value and the first control value, e.g. calculating the coordinate deviation angle β by performing the PI control on $(\cos(\theta)\_set)^2 - (Uq')^2/((Uq')^2 + (Ud')^2) = 0$, and the coordinate deviation angle β is overlapped on the motor angle of the current control cycle so as to build a d'q' virtual coordinate system of the next control cycle, such that controlling the power factor on motor side is realized by a constant cycle control.

In other words, in embodiments of the present disclosure, the virtual coordinate system d'q' is built by rotating the coordinate system dq, and the motor is controlled using the control approach of Id'=0 in the virtual coordinate system d'q', such that the angle between the voltage vector and the current vector of the motor is the angle between Uq' and Us, thus realizing the control of the power factor on motor side.

According to an embodiment of the present disclosure, before the control circuit 20 overlaps the coordinate deviation angle to the motor angle of the current control cycle by the control module 20, an angle limiter is used to perform an angle limiting process on the coordinate deviation angle, thus avoiding an out-of-step of the motor control caused by an abnormal control of the power factor on motor side.

According to an embodiment of the present disclosure, a location estimating circuit 30 is configured to perform location estimation on the motor, for obtaining the motor angle. For example, the motor angle of the current control cycle may be obtained by performing the location estimation on the motor without a location sensor, in which the motor angle is in terms of the coordinate system dq.

Further, as shown in FIG. 4, during the process of controlling the motor using the control approach of Id'=0 by the control circuit 20, the current of the motor in the current control cycle may be obtained via a current transformer, direct-axis current Id' and quadrature-axis current Iq' in the virtual coordinate system of the current control cycle are obtained by performing a Clark transformation and a Park transformation on the current of the motor, and the PI control is performed on the direct-axis current Id' and the quadrature-axis current Iq' in the virtual coordinate system of the current control cycle respectively, so as to obtain the direct-axis voltage Ud' and quadrature-axis voltage Uq' of the current control cycle.

The deviation angle calculating circuit 10 obtains the coordinate deviation angle according to the given power factor control target value and the abtained direct-axis voltage Ud' and quadrature-axis voltage Uq' of the current control cycle, the specific obtaining process of which is shown in FIG. 5. As shown in FIG. 5, a first coordinate deviation angle is outputted by performing the PI control on a difference $(\cos(\theta)\_set)^2-(Uq')^2/(Uq')^2+(Ud')^2$ between the target control value and the first control value, and then the coordinate deviation angle β is outputted by performing with the angle limiter a limit process on the first coordinate deviation angle outputted after the PI control, in which, an upper limit of the angle limiter may be 30 degree, and the lower limit may be −30 degree.

Meanwhile, the motor angle θ_fdk of the current control cycle is obtained by the location estimating circuit 30, and the coordinate deviation angle β is overlapped onto the motor angle θ_fdk of the current control cycle so as to participate in an inverse Park transformation and the Park transformation of the next control cycle, such that controlling the power factor on motor side is realized by a constant cycle control.

According to the device for controlling a power factor on motor side provided by embodiments of the present disclosure, the quadrature-axis voltage Uq' and the direct-axis voltage Ud' in the virtual coordinate system of the current control cycle are obtained by controlling the motor using a control approach of Id'=0, the coordinate deviation angle is obtained according to the quadrature-axis voltage Uq', the direct-axis voltage Ud' and the power factor control target value, and the coordinate deviation angle is overlapped to the motor angle of the current control cycle so as to build the virtual coordinate system of a next control cycle, such that controlling the power factor on the motor side is realized. In other words, the virtual coordinate system is built by rotating the coordinate system dq, and the motor is controlled using the control approach of Id'=0 in the virtual coordinate system, such that the angle between voltage vector and current vector of the motor is the angle between Uq' and a vector sum of Uq' and Ud' in the virtual coordinate system, thus realizing an accurate control for the power factor on motor side without obtaining the accurate operation parameters of the motor, increasing the usage efficiency of a frequency converter, a driving efficiency and a working efficiency of the motor.

In addition, a motor control system is provided in embodiments of the present disclosure, and the motor control system includes the above-described device for controlling the power factor on motor side.

With the above described device for controlling the power factor on motor side, the motor control system in embodiments of the present disclosure can realize an accurate control on the power factor on the motor side without obtaining the accurate operation parameters of the motor, which increases the usage efficiency of a frequency converter, a driving efficiency and a working efficiency of the motor.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means at least two, for example two or three or the like, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above-described phrases in various places throughout this specification are not necessarily referring to the same embodiment or example of the present disclosure. Furthermore, the particular features, structures, materials, or characteristics may be combined in any suitable manner in one or more embodiments or examples. In addition, in a situation without conflicting, features in different embodiments or examples described in the present specification may be combined or composed by the person skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a power factor on motor side, comprising:
controlling the motor using a control approach of Id'=0 so as to obtain a quadrature-axis voltage Uq' and a direct-axis voltage Ud' in a virtual coordinate system of a current control cycle;
calculating a first control value according to the quadrature-axis voltage Uq' and the direct-axis voltage Ud' in the virtual coordinate system of the current control cycle;
obtaining a power factor control target value, and calculating a target control value according to the power factor control target value; and
performing a PI control on a difference between the target control value and the first control value so as to obtain a coordinate deviation angle, and overlapping the coordinate deviation angle to a motor angle of the current control cycle so as to build a virtual coordinate system of a next control cycle, such that the power factor on the motor side is controllable.

2. The method according to claim 1, wherein, before overlapping the coordinate deviation angle to the motor angle of the current control cycle, an angle limiting process is performed on the coordinate deviation angle.

3. The method according to claim 1, wherein, the first control value is calculated according to a formula of $$A=(Uq')^2/(Uq')^2+(Ud')^2,$$

where, A is the first control value, Uq' is the quadrature-axis voltage in the virtual coordinate system, and Ud' is the direct-axis voltage in the virtual coordinate system.

4. The method according to claim 1, wherein, the motor angle is obtained by performing location estimation on the motor.

5. A device for controlling a power factor on motor side, comprising a deviation angle calculating circuit and a control circuit, wherein,
the control circuit controls the motor using a control approach of Id'=0 so as to obtain a quadrature-axis voltage Uq' and a direct-axis voltage Ud' in a virtual coordinate system of a current control cycle;
the deviation angle calculating circuit calculates a first control value according to the quadrature-axis voltage Uq' and the direct-axis voltage Ud' in the virtual coordinate system of the current control cycle, obtains a power factor control target value, calculates a target control value according to the power factor control target value, and performs a PI control on a difference between the target control value and the first control value so as to obtain a coordinate deviation angle; and
the control circuit overlaps the coordinate deviation angle to a motor angle of the current control cycle so as to build a virtual coordinate system of a next control cycle, such that the power factor on the motor side is controllable.

6. The device according to claim 5, further comprising:
an angle limiter, configured to perform an angle limiting process on the coordinate deviation angle before the control module overlaps the coordinate deviation angle to the motor angle of the current control cycle.

7. The device according to claim 5 or 6, wherein, the first control value is calculated by the deviation angle calculating circuit according to a formula of $$A=(Uq')^2/(Uq')^2+(Ud')^2,$$

where, A is the first control value, Uq' is the quadrature-axis voltage in the virtual coordinate system, and Ud' is the direct-axis voltage in the virtual coordinate system.

8. The device according to claim 5, further comprising:
a location estimating circuit, configured to perform location estimation on the motor, for obtaining the motor angle.

9. A motor control system, comprising a device for controlling a power factor on motor side, wherein the device for controlling the power factor on motor side comprises a deviation angle calculating circuit and a control circuit,
the control circuit controls the motor using a control approach of Id'=0 so as to obtain a quadrature-axis voltage Uq' and a direct-axis voltage Ud' in a virtual coordinate system of a current control cycle;
the deviation angle calculating circuit calculates a first control value according to the quadrature-axis voltage Uq' and the direct-axis voltage Ud' in the virtual coordinate system of the current control cycle, obtains a power factor control target value, calculates a target control value according to the power factor control target value, and performs a PI control on a difference between the target control value and the first control value so as to obtain a coordinate deviation angle; and
the control circuit overlaps the coordinate deviation angle to a motor angle of the current control cycle so as to build a virtual coordinate system of a next control cycle, such that the power factor on the motor side is controllable.

10. The motor control system according to claim 9, wherein the device for controlling the power factor on motor side further comprises:
an angle limiter, configured to perform an angle limiting process on the coordinate deviation angle before the control module overlaps the coordinate deviation angle to the motor angle of the current control cycle.

11. The motor control system according to claim 9, wherein the first control value is calculated by the deviation angle calculating circuit according to a formula of $$A=(Uq')^2/(Uq')^2+(Ud')^2,$$

where, A is the first control value, Uq' is the quadrature-axis voltage in the virtual coordinate system, and Ud' is the direct-axis voltage in the virtual coordinate system.

12. The motor control system according to claim 9, wherein the device for controlling the power factor on motor side further comprises:
a location estimating circuit, configured to perform location estimation on the motor, for obtaining the motor angle.

* * * * *